(12) United States Patent
Fina Segura

(10) Patent No.: US 10,935,138 B2
(45) Date of Patent: Mar. 2, 2021

(54) SEALING SYSTEM FOR SEALING EXPANSION JOINTS AND METHOD FOR PLACING THE SAME

(71) Applicant: José Ma Fina Segura, Girona (ES)

(72) Inventor: José Ma Fina Segura, Girona (ES)

( * ) Notice: Subject to any disclaimer, the term of this patent is extended or adjusted under 35 U.S.C. 154(b) by 0 days.

(21) Appl. No.: 16/303,721

(22) PCT Filed: May 22, 2017

(86) PCT No.: PCT/ES2017/000056
§ 371 (c)(1),
(2) Date: Nov. 21, 2018

(87) PCT Pub. No.: WO2017/203071
PCT Pub. Date: Nov. 30, 2017

(65) Prior Publication Data
US 2020/0240521 A1 Jul. 30, 2020

(30) Foreign Application Priority Data
May 24, 2016 (ES) .................................. 201630674

(51) Int. Cl.
*F16J 15/3284* (2016.01)

(52) U.S. Cl.
CPC ................................ *F16J 15/3284* (2013.01)

(58) Field of Classification Search
CPC .. F16J 15/3284; F16J 15/32; F16J 1/06; F16J 1/04; F16J 9/06; F16J 9/08; E01C 11/00; E01C 11/06; E01C 11/126

USPC ......................................................... 277/379
See application file for complete search history.

(56) References Cited

U.S. PATENT DOCUMENTS

| 2,158,637 | A | * | 5/1939 | Robertson | ............... E01C 11/14 404/58 |
| 3,368,464 | A | * | 2/1968 | Thorp, Jr. | ............. E01C 11/106 404/74 |
| 3,504,597 | A | * | 4/1970 | Pare | ...................... E01C 11/126 404/67 |
| 3,720,142 | A | * | 3/1973 | Pare | ...................... E01C 11/126 404/67 |

\* cited by examiner

*Primary Examiner* — Nathan Cumar
(74) *Attorney, Agent, or Firm* — Eugenio J. Torres-Oyola; Victor M. Rodriguez-Reyes; Rafael Rodriguez-Muriel

(57) ABSTRACT

The present invention relates to a sealing system provided with a self-expanding seal for sealing expansion joints in buildings, said seal consisting of a first body 11 and a second body 12 which are elongated and arranged opposite one another, connected by means of a waterproof flexible body 30 and by means of expanders 20 that produce an elastic thrust for separating said first and second bodies which are thus trapped inside the expansion joint to be sealed. Said seal includes retainers 40 which keep it in a pre-compressed position, allowing easy placement within the joint to be sealed, and which may be released producing the instantaneous expansion of the self-expanding seal.

20 Claims, 12 Drawing Sheets

FIG. 13

SEALING SYSTEM FOR SEALING EXPANSION JOINTS AND METHOD FOR PLACING THE SAME

This application is a U.S. national stage of PCT/ES2017/000056 filed on 22 May 2017, which claims priority to and the benefit of Spanish Application No. P201630674 filed on 24 May 2016, the contents of which are incorporated herein by reference in their entireties.

FIELD OF THE ART

The present invention relates to the field of self-expanding seal systems for sealing expansion joints and a method for placing same, said self-expanding seal system being of the type including elastic expanders which allow the expansion and adaptation of the self-expanding seal system inside the expansion joint to be sealed, such that variations in the width of said expansion joint due to temperature changes, or variations in the arrangement of the lateral planes thereof due either to differential seatings or to the collapse of the adjacent bodies forming same, can be absorbed by said seal without affecting the leaktightness of the seal. Additionally, the self-expanding seal system can include a jig which collaborates with the placement of the rest of the self-expanding seal system and the method for placing said self-expanding seal system are also described.

Within this field and more specifically, the present invention focuses on the sub-field of seals which, by means of different solutions, perform their function by providing elements that are located exclusively inside the expansion joints to be treated. Even more specifically, within this latter sub-category the present invention provides solutions for vertical or horizontal expansion joints that are, however, located or formed within considerably vertical adjacent planes, and in the event that said joints are formed within considerably horizontal adjacent planes, the solutions are only applicable in a maximum joint length of two meters and only if a free outlet is available at one of the ends.

On the other hand, the condition of this seal and of other seals existing on the market which perform their function inside expansion joints in an immediate longitudinal strip with respect to external planes allows the application thereof in construction work that has been completed or in the restoration of existing joints, both in expansion joints existing on facades or outer surfaces formed by a single finishing material, open work, concrete, solid stone, laminated steel profiles, glass, etc., and in joints of composite outer surfaces or facades, i.e., surfaces finished with plasters, renderings, or veneers made, for example, on a ceramic or prefabricated block base.

STATE OF THE ART

Seals for expansion joints are widely known and there are many different models on the market which can be grouped into three families.

On one hand, there are seals based exclusively on the use of polyurethane putties, silicones, resins, etc., that are packed in cartridges and emptied manually by means of "applicator syringes" into the inner space of the joint for filling, sealing, and finishing same before the manual implantation of longitudinal tubes prefabricated from a compressible spongy material as a bottom inside the joint, the function of which is to limit the depth from the outside of the sealing filler to a pre-established dimension depending on the width of the joint, with longitudinal priming of both side contact surfaces by means of compatible adhesives being performed prior to said emptying.

Seals of this type often have a limited elastic capacity that is lower than the capacity required by actual movements of the joints, so when movement occurs, the seals either become detached from the sides or have the section thereof torn in half, causing a visible crack and thereby the loss of the required leaktightness. Another serious drawback is that the seals can be easily destroyed as a result of vandalism carried out in accessible areas.

On the other hand, there are seals based on the insertion of a self-expanding material into the joint such that the expansion of said material keeps the seal fitted within the expansion joint while at the same time adapting to changes in joint size due to variations in temperature without losing sealing properties.

Within this family, products based on plastic or rubbery honeycomb tubes or weatherstrips with or without an elastic metal frame embedded in the mass, for example, are known, where these products can be compressed manually or by means of a specific tool to make it easier to introduce them into expansion joints, such that upon expansion in the joints, the products press against both inner side surfaces, thereby achieving the sealing function.

However, the elasticity of these bodies, and therefore their capacity to adapt to changes in joint size, are usually rather limited, so manufacturers of these products recommend gluing them to the side surfaces in order to prevent not only the loss of sealing function which always occurs given the circumstances, but also to prevent possible detachments in the event that the expansive capacity thereof is exceeded.

Within this same category there are products formed by honeycomb weatherstrips which, however, include the fastening of said weatherstrips by means of staples to occasional mechanical springs that are located in the innermost part of the joint in order to prevent their detachment in the event that their limited expansive capacity is exceeded. Despite this precaution of a mechanical nature which prevents detachment, the problem relating to its limited expansive capacity and subsequent loss of leaktightness persists.

Generally, seals from this entire category can also readily deteriorate as a result of vandalism carried out in accessible sectors.

Finally, there are the seals which are based on mixed systems formed, on one hand, by a pair of longitudinal mechanical elements with the basic function of coupling and holding onto the support, and on the other hand, by rubbery elements or flexible strips which, by means of the longitudinal engagement and collaboration of the two preceding elements, allow providing the assembly with its sealing property. Some of these seals additionally provide an element on the outer part thereof which contributes to protecting the assembly from vandalism which may damage the existing flexible strips.

Among them, there are on one hand those which hold the two mechanical parts on both sides of the support by means of screws which, besides requiring a complex installation as the plugs must be placed inside both side surfaces and in an oblique direction open outwardly, tend to cause the constructive bodies adjacent to the expansion joint to chip off as the screws must be arranged very close to the edges.

The products described in documents EP0427756, FR2503821, FR153690, and FR1292205 are also known. All the aforementioned documents describe using a folded flat by way of an expansion spring which separates two ends provided for being in close contact with the opposite inner faces of the expansion joint.

The main problem of these products is that if the spring expanding force is weak, the installation thereof is easier, but the seal is fixed weakly inside the expansion joint, where the intentional or accidental extraction thereof may readily occur, and where leakages may occur. In contrast, if the spring expanding force is very large, placing the seal inside the expansion joint is significantly more difficult.

Finally, document U.S. Pat. No. 4,767,655 discloses, for example, the use of sealing strips formed by an open-cell, foamy multilayer material which is pre-compressed and which is released during the placement thereof. Said material expands, recovering its original size with a delay, which allows the placement thereof inside the expansion joint after release and before complete expansion.

BRIEF DESCRIPTION OF THE INVENTION

The present invention relates to a self-expanding seal system for sealing expansion joints and a method for placing same, the self-expanding seal system optionally by including a placement jig.

According to a first aspect of the present invention, the proposed self-expanding seal system is intended for sealing expansion joints formed between two rigid opposite joint faces of two adjacent constructive bodies. Typically, said expansion joints are a gap spanning a few centimeters (from 1 cm to 5 cm) between two constructive bodies or structures which allow absorbing the expansion movements of said constructive bodies or structures. Therefore, the seal provided for sealing said expansion joint must have a size that allows the insertion thereof into said expansion joint, and it also must be capable of absorbing said movements, assuring leaktightness at all times.

The proposed self-expanding seal system therefore comprises:
  a first body and a second body arranged with the respective inner faces located opposite and spaced apart from one another, said first and second bodies being elongated in a longitudinal direction, and said first and second bodies being provided for being introduced into said expansion joint, with the respective outer faces of said first and second bodies being located opposite said rigid joint faces;
  elastic expanders connected to said first and second elongated bodies causing an elastic spacing of the bodies in a transverse expansion direction;
  a waterproof flexible body loosely connecting said first and second elongated bodies.

Said first and second bodies are two bodies elongated in a longitudinal direction, arranged opposite one another, and intended for being introduced into the mentioned expansion joint, with the respective outer faces of said first and second bodies being arranged opposite the mentioned two rigid joint faces defining the expansion joint to be sealed.

It will be understood that said elastic expanders will consist of elements which can be elastically deformed by means of compression in a specific direction, overcoming an opposing force offered by said elements, and which will recover their initial geometry upon removal of said compression.

Said elastic expanders are connected to said first and second bodies and are configured for producing an elastic force for separating said first and second bodies from one another in a transverse expansion direction of expansion (perpendicular to the longitudinal direction), pushing the respective outer faces thereof against the mentioned joint faces.

Said waterproof flexible body is what prevents water from entering through the expansion joint. Since said waterproof flexible body is loose, the relative movement of said first and second bodies to which it is connected is allowed, maintaining the continuity of the waterproof flexible body, with the latter being more or less smooth.

Furthermore, and in a novel manner, the proposed self-expanding seal system further comprises:
  a releasable retainer device which keeps the rest of the self-expanding seal in a pre-compressed position, said elastic expanders being retained under stress and said first and second bodies being arranged close to one another; said elastic expanders being selected from springs, strips under bending stress, and rods under bending stress.

It will be understood that said releasable retainer device is provided for retaining the expansion of the elastic expanders when the elastic expanders are subjected to elastic stress.

According to an alternative embodiment of said first aspect of the invention, said first and second bodies are:
  flexible and elastic; or
  flexible and elastic and made of a metal or plastic material; or
  flexible and elastic strips having a flat rectangular cross-section; or
  flexible and elastic strips having a flat rectangular cross-section and made of a metal or plastic material.

The mentioned flexibility allows said first and second bodies to adapt to some less pronounced irregularities present on the two rigid opposite joint faces defining the expansion joint, allowing better sealing.

Additionally or alternatively, it is proposed that said outer faces of the first and second bodies include a covering made of an elastomer material between 0.5 and 3 mm thick. Said elastomer material will be a relatively soft and flexible material that is deformable under the force exerted by the elastic expanders. This allows, when the self-expanding seal system is inserted into the expansion joint and the retainer device released, the outer face 14 of the first and second bodies covered with said elastomer material to be pressed against the two rigid opposite joint faces defining the expansion joint. In this position, the expansive force generated by the elastic expanders deforms the elastomer material, allowing it to absorb small irregularities of the mentioned two joint faces, assuring a leak-tight sealing.

This construction allows one and the same seal, with the same dimensions, to be coupled to joints of very different sizes, because the proposed seal can expand in the transverse expansion direction by more than 400% or more than 500% from the pre-compressed position to an expanded working position, with there naturally being a maximum limit of expansion after which the seal no longer works properly, where this limit is considered to be below about 850%.

It will be understood that a transverse direction is a direction comprised in a plane transversely sectioning the proposed seal.

Therefore, with the thickness in the transverse expansion direction of the seal being about 0.7 cm in the pre-compressed position, for example, said seal can adapt to and perform its function in joints having a width comprised between 1 cm and 5 cm without its sealing capacities being affected.

In a preferred embodiment, said elastic expanders include a first set of the expanders, which will have a region articulated to the inner face of the first body and an opposite region supported in a movable manner on the inner face of the second body, and a second set of expanders, which will have a region articulated to the inner face of the second body and an opposite region supported in a movable manner on the inner face of the first body, the elastic expanders constitutive of the second set of expanders being interspersed between the elastic expanders constitutive of the first set of expanders.

Said articulation between the region of the elastic expanders and one of the first and second bodies is preferably carried out by means of arm anchors arranged in said first or second body.

It is furthermore contemplated that the elastic expanders constitutive of the first set of expanders and the elastic expanders constitutive of the second set of expanders are connected to one another, allowing a relative movement in the longitudinal direction of the elastic expanders constitutive of the first set of expanders, together with the first body to which they are articulated, with respect to the elastic expanders constitutive of the second set of expanders, together with the second body to which they are articulated.

In a contemplated embodiment, said connection between the elastic expanders constitutive of the first and second sets of expanders is carried out by means of an intermediate rod on which said elastic expanders can slide in the longitudinal direction.

In the event that a relative movement in the longitudinal direction occurs between the two opposite joint faces, for example, a vertical movement due to a differential seating of the construction, this arrangement allows the first and second bodies to move with respect to one another and the regions of the elastic expanders supported on the inner faces to slide thereon in the longitudinal direction without stopping the application of the expansive force, and without sustaining deformations which may alter the direction or intensity of the expansive force applied on the first and second bodies.

Said intermediate rod can preferably be connected to each elastic expander at an intermediate point between its two opposite regions which are in contact with the inner faces of the first and second bodies. The intermediate rod will therefore be arranged equidistant from the two regions of the elastic expanders and therefore centered with respect to the first and second bodies when they are arranged aligned with and opposite one another.

In the event of a misalignment of the opposite joint faces due to the construction integrating the joint to be sealed collapsing, for example, movement of the first body with respect to the second body in a transverse direction will occur. In that case, the two regions of the elastic expanders will rotate with respect to the first and second bodies as a result of said regions being articulated and supported, respectively, but the expansive force will remain unchanged at all times, so the proposed seal is capable of absorbing deformations of this type without experiencing leakages or detachments. If the elastic expanders are not straight expanders, where they are, for example, two lever arms of the same length attached at an angle at the point where they are connected with the intermediate rod, forming a kind of triangle in which one of the sides is non-existent, this movement will cause the intermediate rod to become off-centered with respect to the first and second bodies, but the expansive force will remain unchanged and constant.

The proposed invention therefore provides a seal capable of absorbing relative movements between the joint faces in a transverse expansive direction due to expansions, as well as a movement in the longitudinal direction due, for example, to a differential seating, and it is even capable of absorbing a transverse movement perpendicular to the transverse expansive direction due, for example, to the two constructions determining the two opposite joint faces collapsing in a different manner. All the described movements can likewise be caused by earthquakes, where the proposed seal is likewise suitable for seismic zones. Therefore, the proposed seal has the capacity to absorb considerable movements on three orthogonal axes without losing its sealing capacities.

The two opposite regions of the elastic expanders preferably press on the inner faces of the respective first and second bodies at the geometric center thereof for the purpose of preventing the generation or transmission of eccentric or bending forces on said first and second bodies.

The expanders will be sized and distributed to produce an expansive force equal to or greater than 25 kg or 35 kg for every linear meter of seal, while reaching up to 40 kg per linear meter is preferable.

According to an additional embodiment, it is proposed that said elastic expanders are a plurality of torsion springs arranged at regular intervals along the longitudinal direction, each one producing a force for separating the first body with respect to the second body in the transverse expansion direction. By way of example, it is proposed that each of said torsion springs is made up of a single continuous, bent torsion rod forming a first lever arm connected at one end to a first coil spring, connected to a second lever arm which is in turn connected in continuity to a third lever arm, and said third lever arm being connected to a second coil spring which is in turn connected to a fourth lever arm, said first and second coil springs being coaxial, and said second and third lever arms being parallel to one another, forming as a whole an intermediate lever arm, and said first and fourth lever arms being parallel to one another.

Preferably, said first and fourth lever arms will be connected to one of the first and second bodies, and the intermediate lever arm will be connected to the other one of the first and second bodies.

Since the described torsion spring is symmetrical, with two coil springs and two lever arms connected to each of the first and second bodies, expansive force is produced in the transverse expansion direction, without asymmetries or rotations.

It is proposed that said connection between the first and fourth lever arms and one of the first and second bodies is carried out by means of arm anchors arranged in said first or second body. Preferably, the free ends of the first and fourth lever arms will be connected to said arm anchors.

According to a proposed embodiment, said plurality of torsion springs are alternately arranged in reverse orientations along the longitudinal direction, such that a first group of alternating torsion springs have the corresponding intermediate lever arm thereof connected to the first body, and a second group of alternating torsion springs, interspersed between said alternating torsion springs of the first group, have their corresponding intermediate lever arms connected to the second bodies.

According to another embodiment, all the coil springs of all the torsion springs are threaded on an intermediate rod.

Additionally, it is proposed to include a plurality of trim supports attached at regular intervals on said intermediate rod, said trim supports being provided for the anchoring of a trim cover to conceal the self-expanding seal system.

According to another envisaged embodiment, the aforementioned retainer device may consist of a plurality of first anchors arranged in said first body, a plurality of second anchors arranged in said second body, and connectors simultaneously attached to said first anchors and said second anchors, fixing their relative position, and preventing their movement in the transverse expansion direction.

Said first and second anchors may be, by way of non-limiting example, eyelets provided for the alignment of the first and second bodies when they are arranged close to one another, and wherein said connectors consist of pins provided for being inserted through said eyelets in a transverse direction perpendicular to the transverse expansion direction.

In a proposed embodiment, the mentioned releasable retainer device is associated with a release mechanism provided for causing the release of the mentioned releasable connectors and the subsequent expansion of the expanders, said release mechanism being integrated in a jig that can be separated from the rest of the self-expanding seal system after placement. Said jig therefore includes said release mechanism which allows operating, preferably in a simultaneous manner, all the retention means, after which the jig can be separated from rest of the self-expanding seal system, where it can even be used again for placing other self-expanding seal system.

It is proposed that said release mechanism causes, by way of example, the movement of connectors in a transverse direction perpendicular to the transverse expansion direction, causing the extraction thereof from the first and second anchors arranged respectively in the first and second bodies of the self-expanding seal system, causing the release thereof. Said connectors and said first and second anchors would therefore be an integral part of the retainer device.

The mentioned jig can be connected to the rest of the self-expanding seal system by means of releasable connectors, for example, a rod ending with an elastic clamp connected to the intermediate rod, allowing the seal to remain in its correct relative position with respect to the joint and the jig through said releasable connectors during the connector release operation and before the seal is fixed in the expansion joint by elastic expansion of the expanders.

Additionally, the addition of a centering mechanism to the self-expanding seal system is proposed to correctly position the rest of the self-expanding seal system at a pre-defined depth and in a centered position with respect to said two rigid opposite joint faces of two adjacent constructive bodies of the expansion joint. Said centering mechanism will preferably be releasable from the rest of the self-expanding seal system and/or integrated in said jig and/or adjustable. Therefore, in addition to the release mechanism described above, in a preferred embodiment the mentioned jig will incorporate said centering mechanism which will be adjustable to adapt to different expansion joint sizes. After the placement of the self-expanding seal system, the jig along with its attached mechanisms will be released from the rest of the self-expanding seal system by means of the release of the releasable connectors.

According to one embodiment, said centering mechanism consists of at least two opposite stop bodies movable in a direction parallel to the transverse expansion direction in a simultaneous and symmetrical manner. Said stop bodies will be in contact with the two opposite joint faces, and the adjustment thereof will allow moving said stop bodies away from or closer to one another so as to adapt them to the distance existing between said two opposite joint faces.

The described self-expanding seal system allows the expanders to have a large expansive force, which favors proper sealing, without negatively affecting the insertion method, as a result of the pre-compressed position obtained by the retainer device. Furthermore, the proposed seal adapts to expansion joints of many different widths, therefore being very versatile, and allowing the absorption of significant variations in expansion joint size without compromising the leaktightness that is offered.

The different movements or collapses of the two sides of the expansion joint can also be absorbed by the proposed self-expanding seal system without losing leaktightness, as a result of the first and second bodies being movable in an independent manner, while at the same time maintaining the expansive force of the expanders which can absorb said different movements of the first and second bodies without the operation thereof being affected, and as a result of the waterproof flexible body loosely connecting said first and second bodies, therefore also allowing a different movement thereof without generating stresses in said waterproof flexible body which may be detrimental to the leaktightness of the self-expanding seal system.

In the event of a differential seating between both sides of the expansion joint to be sealed, the first and second bodies can move with respect to one another in the longitudinal direction within a range of up to 1 or 2 cm without the expanders losing their effect, given that each individual expander is only fixed on one of the two bodies, where the end thereof supported on the other body can move longitudinally, maintaining the expansive force.

If both sides of the expansion joint to be sealed collapse in a different manner, the first and second bodies can move with respect to one another in a transverse direction perpendicular to the transverse expansion direction within a range of up to 1 or 2 cm without the expanders losing their effect, given that each individual expander can pivot about the mentioned first and second bodies at its two ends, maintaining the expansive force.

According to a second aspect of the invention, a method is also proposed for placing a self-expanding seal system for sealing expansion joints formed between two rigid opposite joint faces of two adjacent constructive bodies, the method being applied to a self-expanding seal system provided with:
  a first body and a second body arranged with the respective inner faces located opposite and spaced apart from one another, said first and second bodies being elongated in a longitudinal direction, and said first and second bodies being provided to be introduced into said expansion joint, with the respective outer faces of said first and second bodies being located opposite said rigid joint faces;
  elastic expanders connected to said first and second elongated bodies causing an elastic spacing of the bodies in a transverse direction;
  a waterproof flexible body loosely connecting said first and second elongated bodies.
    In a novel manner, the mentioned method includes the following manufacturing steps:
  a) positioning said first and second bodies close to one another by subjecting said elastic expanders to stress;
  b) retaining said first and second bodies close to one another and retaining said elastic expanders under stress by means of a releasable retainer device;
and the following placement steps:
  c) introducing the self-expanding seal system into the expansion joint to be sealed;
  d) releasing the releasable retainer device, causing the subsequent expansion of the elastic expanders, the first and second bodies being pressed against the mentioned two rigid opposite joint faces of the expansion joint.

The described method therefore proposes pre-compressing the self-expanding seal system and retaining the self-expanding seal system in a pre-compression position which makes it easier to introduce the self-expanding seal system into the expansion joint to be sealed, after which the retention must simply be released in order to cause the elastic expansion of the self-expanding seal system, causing it to be firmly fixed inside the expansion joint, while at the same time allowing expansions without affecting the waterproof sealing the seal offers.

Additionally, in a non-limiting manner, it is proposed that manufacturing step b) furthermore includes:
  connecting said releasable retainer device to a release mechanism, said release mechanism being integrated in a jig connected to rest of the self-expanding seal system;
and that placement step d) furthermore includes:
  operating the release mechanism of the jig, causing the release of the releasable retainer device.

It is also proposed that step c) of the method furthermore includes positioning the self-expanding seal system inside the expansion joint at a pre-defined depth and centered between the two rigid opposite joint faces by means of a centering mechanism integrated in said jig.

According to an additional embodiment, said release of the releasable retainer device of step d) is carried out simultaneously in the entire seal.

Said release of the releasable retainer device of step d) is furthermore proposed to be carried out by means of a movement, in a transverse direction perpendicular to the transverse expansion direction, of a plurality of connectors making up said releasable retainer device, said connectors being connected to the release mechanism.

The present description furthermore contemplates a third aspect of the invention in which the self-expanding system further includes a jig proposed for placing the rest of the self-expanding seal system. The mentioned jig will be provided to be connected to rest of the self-expanding seal system for sealing expansion joints formed between two rigid opposite joint faces of two adjacent constructive bodies, said jig including a release mechanism connected to a releasable retainer device of the self-expanding seal system attached to said jig, said releasable retainer device being provided to keep said self-expanding seal in the pre-compressed position in which elastic expanders of the self-expanding seal system are retained under stress, and in which first and second bodies are kept close to one another, said first and second bodies being elongated in a longitudinal direction and said expanders producing a force for separating said first and second bodies in a transverse expansion direction.

The mentioned jig is therefore connected to the rest of the self-expanding seal system like the one described in the first aspect of the invention, with said self-expanding seal system in the pre-compressed position. The mentioned jig comprises a release mechanism connected to the retainer device of the self-expanding seal system, such that the operation of said release mechanism releases said releasable retainer device, causing the expansion of the self-expanding seal system, after which the jig is released from the rest of the self-expanding seal system.

According to an alternative embodiment, said release mechanism is connected to a plurality of connectors making up said releasable retainer device of the self-expanding seal system, and wherein said release mechanism causes the simultaneous release of all of said connectors.

Additionally, it is proposed that said release mechanism causes the movement of said connectors in a transverse direction perpendicular to the transverse expansion direction, causing the extraction thereof from the first and second anchors arranged respectively in the first and second bodies of the self-expanding seal system, causing the release thereof.

Said jig preferably includes centering mechanisms which place said jig in a relative position with respect to said two rigid opposite joint faces of two adjacent constructive bodies, the self-expanding seal system thereby being connected to said jig, inserted into said expansion joint at a pre-defined depth and in a centered position with respect to the width of said expansion joint.

It is also proposed that said centering mechanisms are adjustable, for example, by means of at least two opposite stop bodies movable in a transverse direction in a simultaneous and symmetrical manner. Said stop bodies can interact with the two rigid opposite joint faces defining the expansion joint, allowing the centering of said jig with respect to the expansion joint, regardless of the width of said joint.

Therefore, as a result of the proposed solution, a modular seal is obtained for the treatment of expansion joints where, unlike the supporting methods in earlier known systems, the static and firm connection of said modular seal to the support and its capacity for correct actuation are based only on rubbing against both opposite joint faces without resorting to the application of mechanical plugs, adhesives, or by means of mixed systems of on-site adherence-compression of manually adaptable materials or profiles. Rather, this capacity to achieve suitable friction for supporting same is obtained through instantaneous release, in the moment of on-site placement, of its own mechanical expansive capacity, which is obtained beforehand by ex-works compression and locking, a differentiating feature that is not present in any of the known systems.

The proposed seal also describes an on-site placement system based on the use of a jig or tool specifically designed to that end which, besides making the operator's work easier, serves two purposes, i.e., it allows, firstly and before the instantaneous release of the internal energy of the segment or module to be placed, temporarily placing and fixing said segment or module inside the joint to be treated, such that it is centered with respect to the width thereof and arranged at the precise height, and secondly, by means of trigger mechanism, it allows releasing all the internal energy of the segment instantaneously, so the segment is now permanently fixed to the support, where the tool can now be disconnected. This instantaneous release of all the energy of the segment is essential in order to achieve the correct positioning of the inner body in the joint, because without it, i.e., when release is performed manually, and therefore gradually, differential stresses and torsions between components, which are incompatible with the attainment of a suitable and precise placement, are generated in the system.

One feature of the proposed seal is its versatility, given that with the use of the same base model suitable treatment can be equally obtained both for very small joint thicknesses of the order of 10 mm and for joint thicknesses up to 50 mm, a versatility that is far superior to that of the known systems.

The proposed seal system consists, on one hand, of a body which performs the functions of stably supporting the system on the support, adapting the system to the support and to the movements thereof, achieving suitable leaktightness of the assembly, and making subsequent fastening of a trim cover thereto by means of staples easier, and it consists, on the other hand, of said trim cover which is formed by a single compressible element serving as a finishing trim and at the same time as an inner body protector, serving to separate parts which is in turn established with as few mechanical connections as possible between them so as to maintain the correct actuation, and serving to preserve the inner body with respect the actions to which the trim cover may be subjected.

Finally it must be pointed out that the proposed seal is the only system for the treatment of structural expansion joints on the market in which the centered and homogenous compression it applies on both opposite joint faces as a result of its specific configuration minimizes stresses between each of the first and second bodies of the proposed seal and the corresponding work surfaces defining the joint to be sealed, therefore offering the additional possibility, for work supports which to a certain degree present excessive roughness or lack flatness, of performing a complementary longitudinal sealing that is free of stresses that may cause the deterioration thereof, by means of applying, between the outer edge of each strip and the corresponding surface, a bead of double polyurethane or silicone putties existing on the market, without said bead performing any supporting function, but only the function of adapting the contact surface of the proposed seal to the rough surface of the joint faces on which it is supported.

A plurality of the proposed seals can be placed in successive alignment until achieving the sealing of any joint length. It is contemplated that the waterproof flexible body is prolonged beyond the first and second bodies, thereby overlapping with the next seal, providing continuity to the leaktightness. This feature allows the seal to be considered a modular seal.

It will be understood that references to geometric positions, such as, for example, parallel, perpendicular, tangent, etc., allow deviations of up to ±5° with respect to the theoretical position defined by said nomenclature.

Other features of the invention will be seen in the following detailed description of an embodiment.

BRIEF DESCRIPTION OF THE DRAWINGS

The foregoing and other advantages and features will be better understood based on the following detailed description of an embodiment in reference to the attached drawings which must be interpreted in an illustrative and non-limiting character, in which:

FIGS. 6, 7, 8, and 9 show successive steps of the process for placing the proposed seal according to a preferred embodiment, in which FIG. 6 shows how the pre-compressed seal, held by means of the jig shown in FIG. 5, is introduced into a joint to be sealed; FIG. 7 shows how operating a centering mechanism integrated in the jig allows positioning the seal at the center of the joint to be sealed; FIG. 8 shows how operating a release mechanism integrated in the jig allows removing the releasable connectors causing the expansion of the seal, to subsequently operate the centering mechanism to release the jig from the joint; and FIG. 9 shows the seal in place inside the joint ready to be covered with a trim cover;

Figure 13:
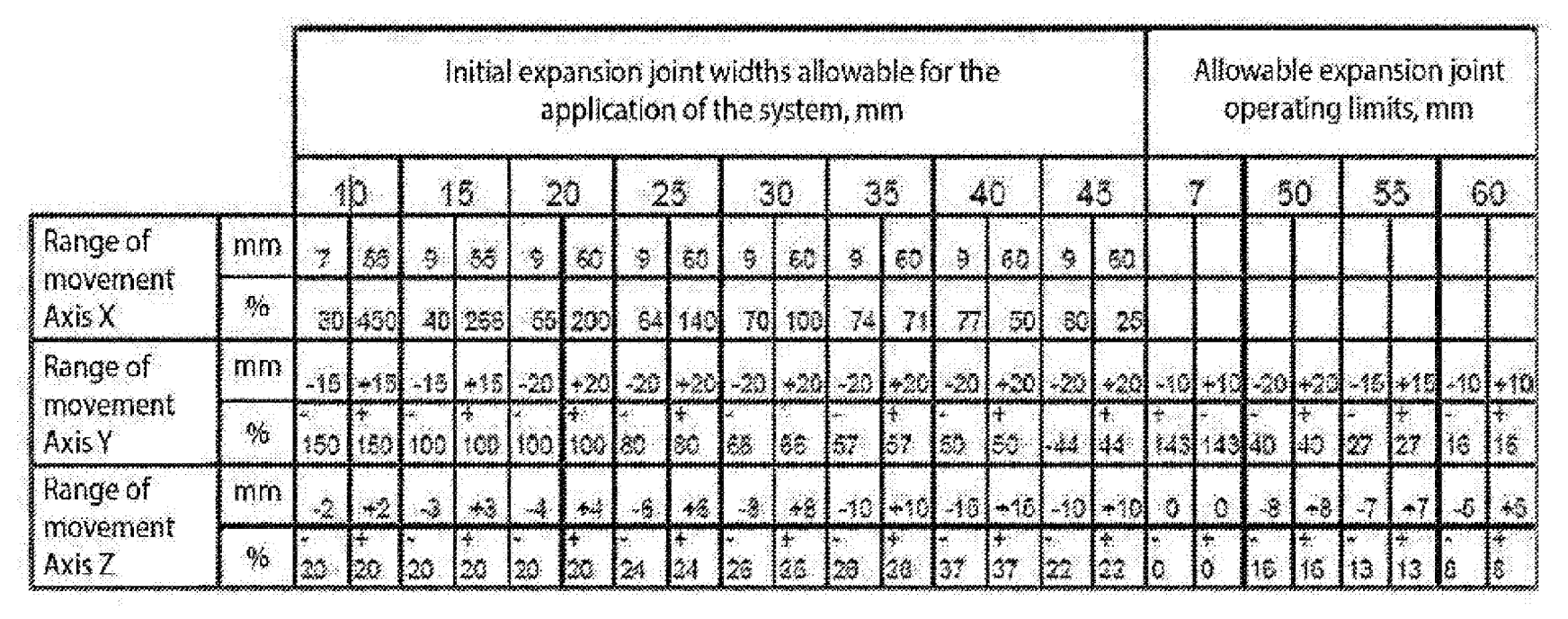

FIG. 13 shows a table specifying, for different widths of the expansion joint to be treated, the capacity of the proposed seal for absorbing dimensional variations in the transverse expansion direction indicated as axis X, the product of expansion movements in a transverse direction perpendicular to the transverse expansion direction indicated as axis Y, the product of collapse and in a longitudinal direction orthogonal to the two preceding ones indicated as axis Z, the product of differential seatings, indicating in each case the range of variation allowed by the seal, maintaining its sealing capacities, both in millimeters and percentage-wise.

DETAILED DESCRIPTION OF AN EMBODIMENT

The object of the present invention relates to a self-expanding seal system for sealing expansion joints applicable in the field of construction and property restoration, specifically in the field relating to providing a solution for outer vertical expansion joints in buildings of all types by means of dry application, i.e., without using adhesives or cements.

The attached drawings show an illustrative, non-limiting embodiment which proposes, according to a first aspect of the present invention, a self-expanding seal system for sealing expansion joints defined between two rigid opposite joint faces 1, for example, between two adjacent structures or two adjacent facades separated between 1 and 5 cm from one another.

Figure 1:
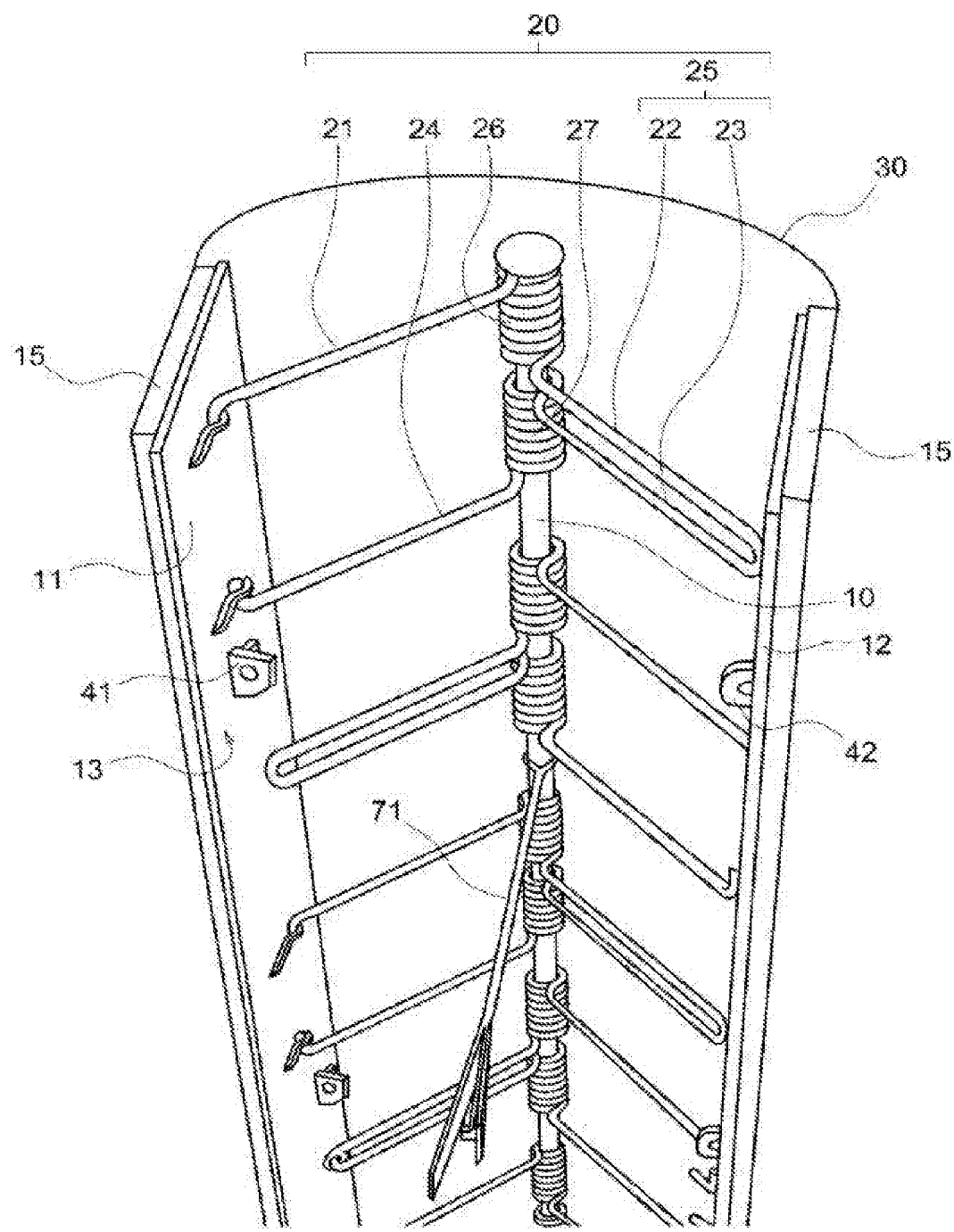
FIG. 1 shows a perspective view of the proposed self-expanding seal system in the expanded position, the self-expanding seal system including two opposite strips spaced apart by means of a plurality of expanders which consist of torsion springs in this embodiment.
Figure 2:
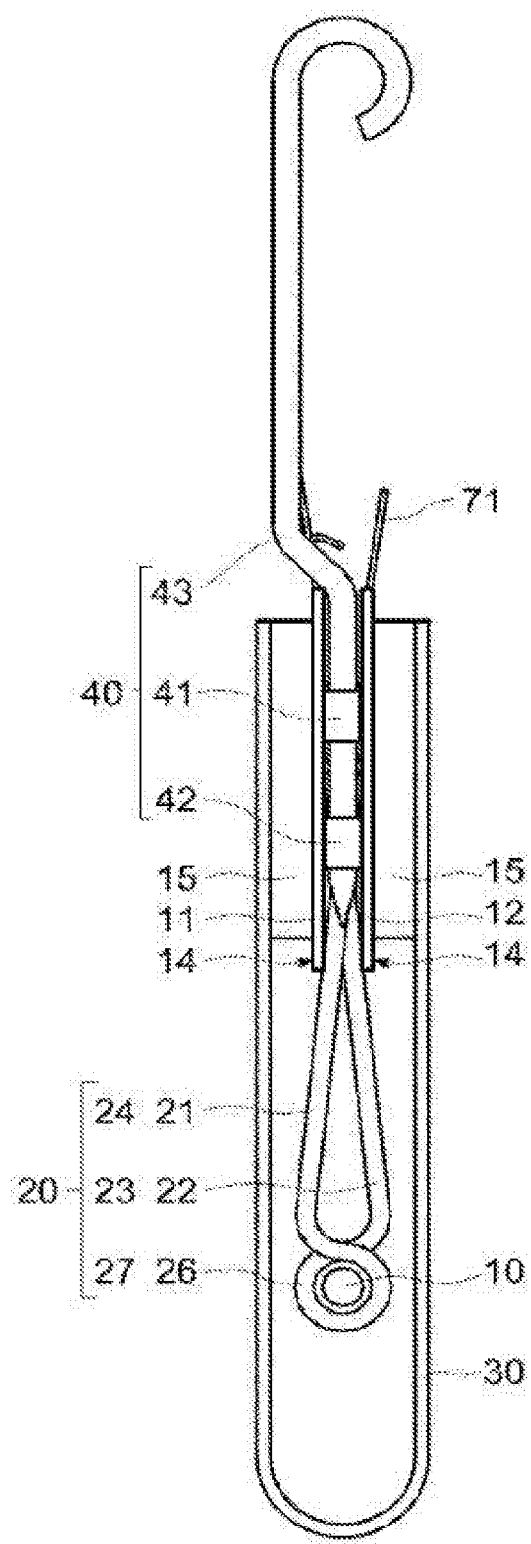
FIG. 2 shows a schematic cross-section view of the proposed self-expanding seal system in the pre-compressed position, and the self-expanding seal system being retained in said position by means of releasable connectors.
Figure 3:
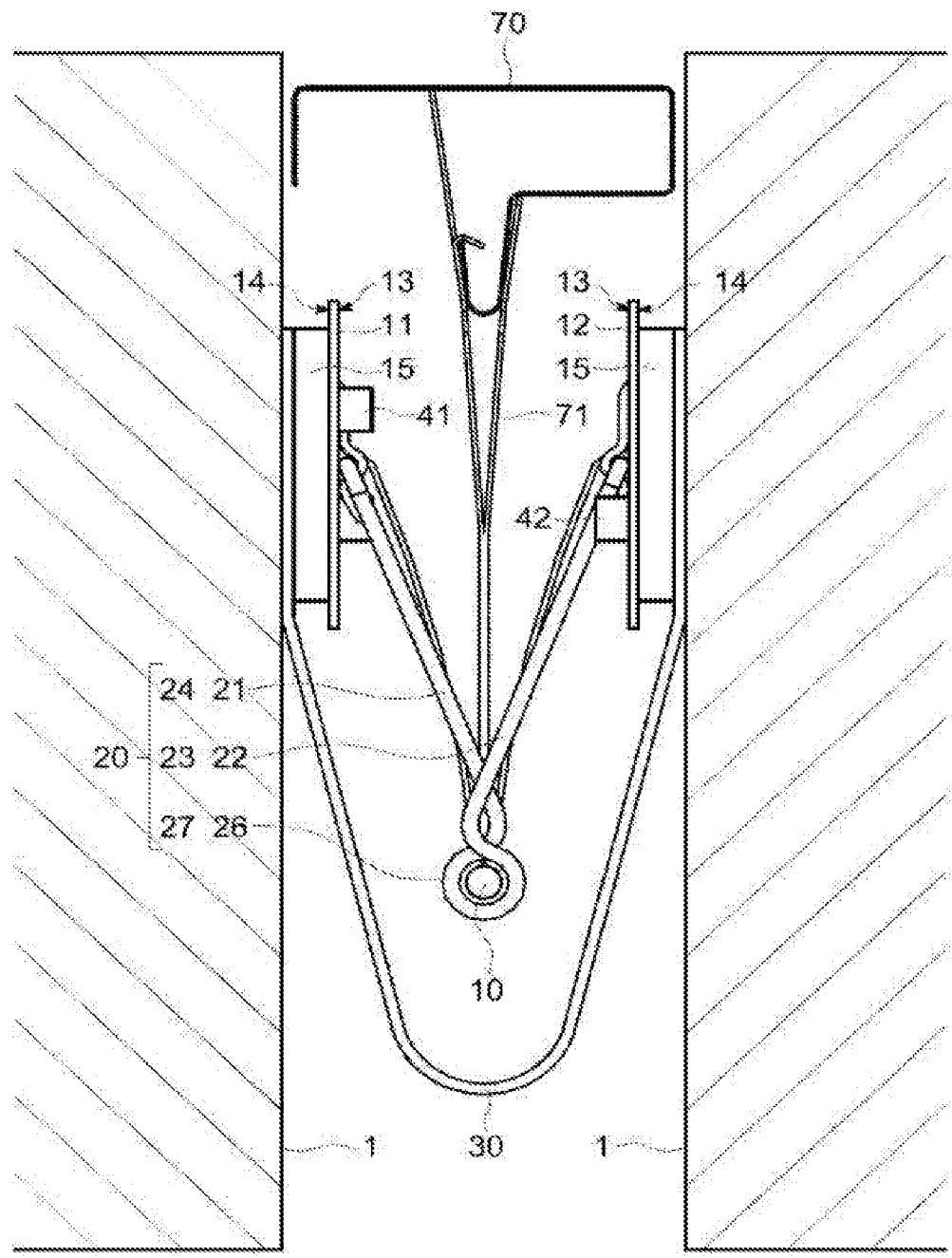
FIG. 3 shows the same view as FIG. 2, with the self-expanding seal system in the expanded position following the release of the releasable connectors, the self-expanding seal system being trapped between the joint faces of the expansion joint, and including a trim cover.
Figure 4:
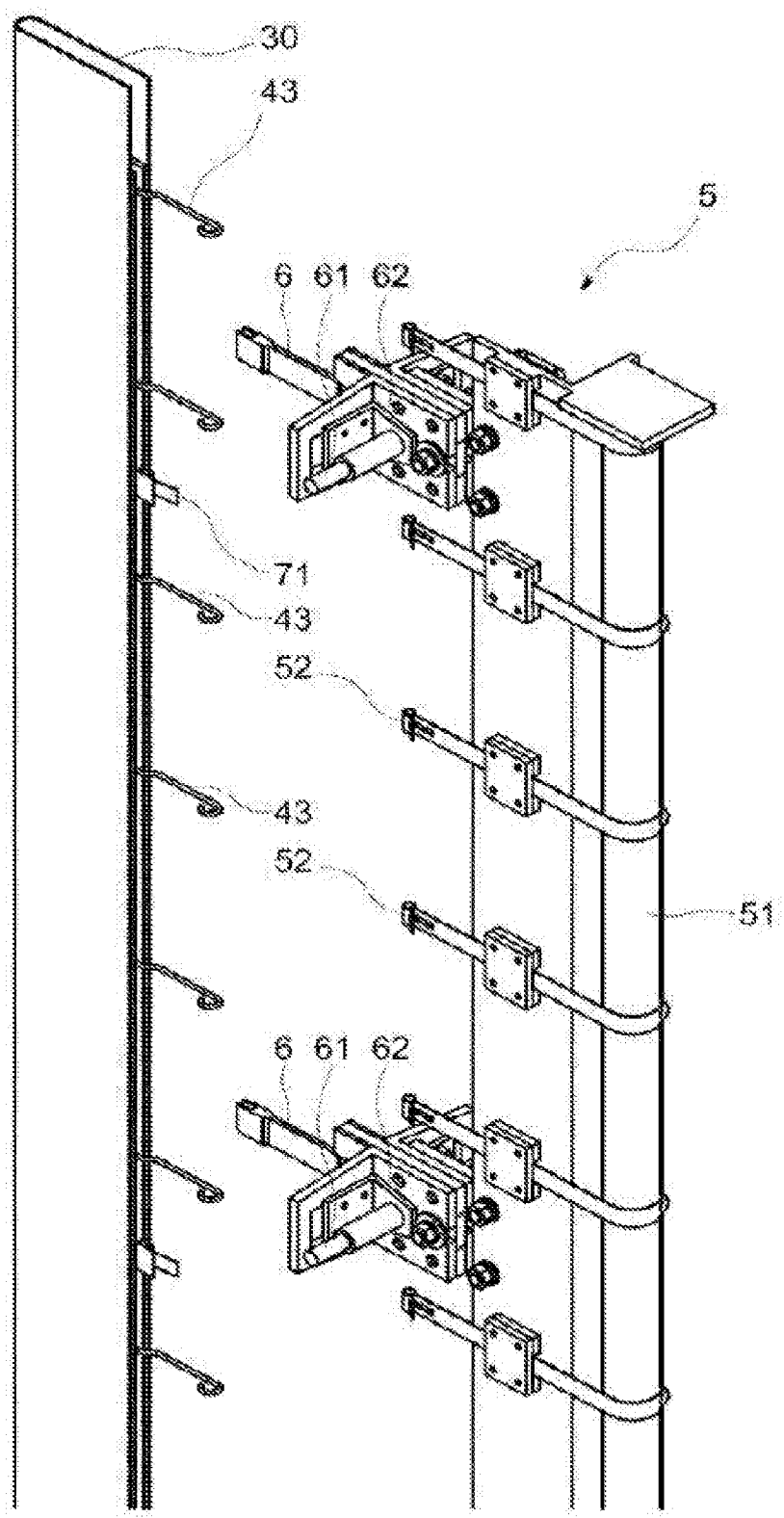
FIG. 4 shows a perspective view of a seal in the pre-compressed position retained by means of the mentioned releasable connectors, in a position opposite a jig provided for being connected to said seal so as to hold it, center it, and release said releasable connectors during placement operations.
Figure 5:
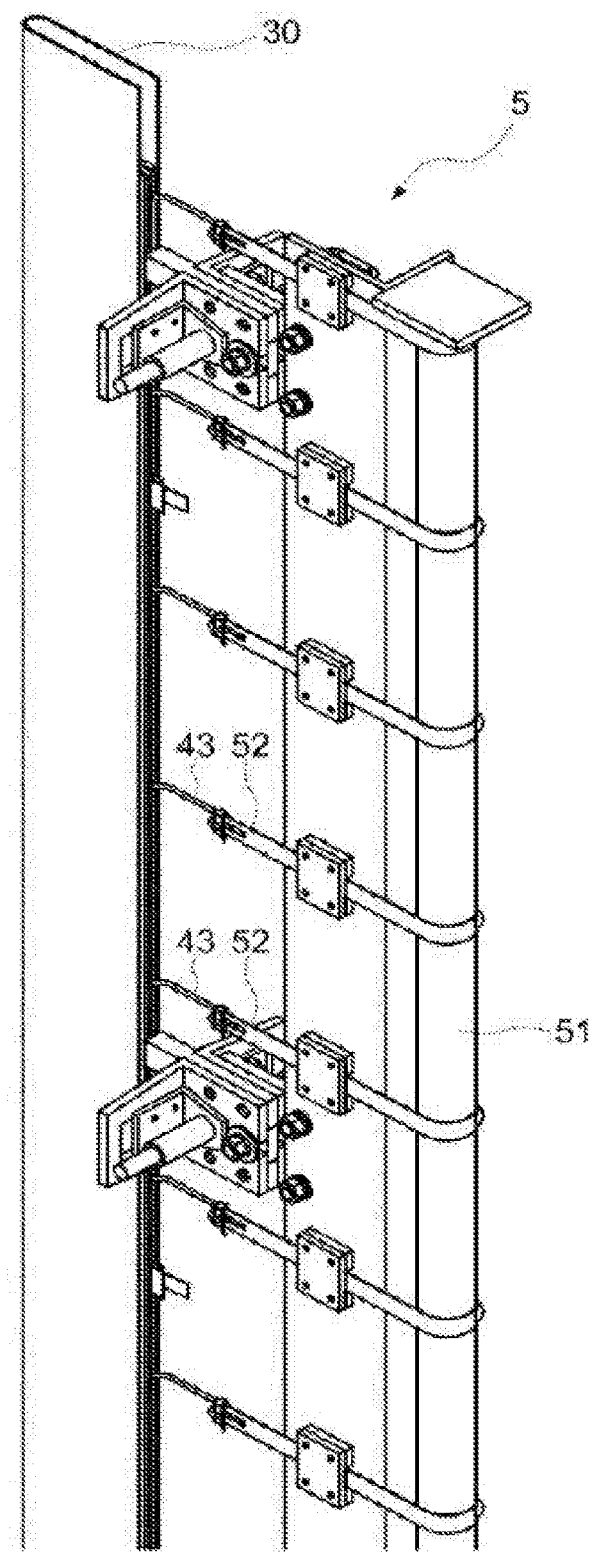
FIG. 5 shows the same view as FIG. 4, with the seal being connected to the jig and all the releasable connectors connected to belts making up a release mechanism integrated in the jig.

FIG. 1 shows the proposed seal according to an embodiment in which said self-expanding seal system has a first body 11 and a second body 12 arranged with their respective inner faces 13 located opposite and spaced apart from one another.

It is proposed that said first body 11 and second body 12 are two metal strips that have a certain elastic flexibility and are elongated in the longitudinal direction, with each of them having a rectangular cross-section and with their two larger opposite faces being an inner face 13 arranged opposite the other strip, and an outer face 14 provided to be arranged opposite the joint faces 1 defining the expansion joint.

A waterproof flexible body 30 will loosely connect the first and second bodies 12. Said waterproof flexible body 30 will preferably be a flexible film or membrane attached to the outer faces 14 of said first body 11 and second body 12, preventing the passage of water through the proposed self-expanding seal system.

An elastomer material 15 will preferably be arranged on the outer face 14 of the first and second bodies 11 and 12, either between said outer face 14 and the mentioned waterproof flexible body 30 or on said waterproof flexible body 30. Said elastomer material 15 will offer tight sealing and improved adaptation to small irregularities of the joint faces 1.

Both the first body 11 and the second body 12 are connected to expanders 20 which, in the present embodiment, consist of a plurality of torsion springs distributed at regular intervals along their length, producing an expansive force which separates the first body 11 and second body 12 in a transverse expansion direction perpendicular to the longitudinal direction.

Each of said torsion springs has a pair of coil springs 26 and 27 arranged symmetrically with their ends connected to lever arms 21, 22, 23, and 24, although other embodiments would be possible.

In that sense, each torsion spring has at least one lever arm connected to the inner face 13 of one of the two opposite strips, and at least another lever arm connected to the inner face 13 of the other strip, although each torsion spring will preferably have two lever arms connected to each strip, with said torsion spring being symmetrical.

As shown in FIG. 1, each of said torsion springs is preferably made up of a single continuous, bent torsion rod forming a first lever arm 21 connected at one end to a first coil spring 26, attached at a distal end to a second lever arm 22 which is in turn attached in continuity to a third lever arm 23 which is attached to a second coil spring 27, which is connected to a fourth lever arm 24, said first and second coil springs 26 and 27 being coaxial, and said second and third lever arms 22 and 23 being parallel to one another, forming as a whole an intermediate lever arm 25, and said first and fourth lever arms 21 and 24 being parallel to one another.

In the present embodiment, all the springs of all the torsion springs are coaxial and threaded on one and the same intermediate rod 10 arranged in the longitudinal direction.

The expansive force of said torsion springs causes the separation of the first body 11 and second body 12 in the transverse expansion direction, causing the outer face 14 of the bodies to be pressed against the two opposite joint faces 1 defining the expansion joint.

It is proposed that the expansive force of the expanders 20 is high so as to assure a firm and long-lasting fixing of the seal inside the expansion joint, but this may hinder the placement thereof given that it is difficult to handle a self-expanding seal system that is several meters in length, for example, in the longitudinal direction, with the seal being expanded before the insertion thereof into the expansion joint. For that reason, it is proposed that said self-expanding seal system includes a retainer device 40 which allows locking the seal in a pre-compressed position in which the expanders 20 are retained under elastic stress, with the first body 11 and second body 12 being arranged close to one another. In this context, "being arranged close to another" will be understood to mean a position opposite the position of maximum expansion of the self-expanding seal system.

In the present embodiment, it is proposed that said retainer device 40 includes first anchors 41 arranged on the inner face 13 of the first body 11, and second anchors 42 arranged on the inner face 13 of the second body 12, each of said anchors 41 and 42 being provided for being coupled to a connector 43. By way of example, it is proposed that said first and second anchors are obtained by directly stamping the first bodies 11 and second bodies 12.

In a preferred embodiment, said first and second anchors 41 and 42 have holes or eyelets and are arranged such that when the seal is placed in the pre-compressed position, said holes or eyelets of the first and second anchors 41 and 42 are aligned, allowing the insertion therethrough of pins which perform the functions of connectors 43. Each of said pins will prevent the separation of the first and second anchors 41 and 42, and therefore the expansion of the self-expanding seal system. The simultaneous removal of all the connectors 43 will therefore cause the simultaneous expansion of the entire self-expanding seal system.

To make the task of positioning and releasing the proposed seal easier, the use of a jig 5 connected to said self-expanding seal system is suggested, said jig 5 being provided with a release mechanism 50 which allows the simultaneous removal of all the connectors 43.

It is proposed that an example of said release mechanism 50 can be, by way of example, a longitudinal guided rod that can move in a transverse direction perpendicular to the transverse expansion direction, said rod being connected to all the retainers 43. An operator can pull on said rod like a trigger, causing the simultaneous extraction of the connectors 43. In another embodiment of the mentioned release mechanism 50 shown in FIGS. 4 to 8, said rod 51 cannot move but can rotate, and it is connected to the retainer device 40 by means of a belt 52 or a strap of flexible material that can be wound on said rod 51. The rotating operation of the mentioned rod 51 will therefore cause the winding of said straps or belts 52, causing the extraction of the mentioned connectors 43 in the transverse direction perpendicular to the transverse expansion direction.

Said jig 5 can furthermore have a centering mechanism 60 consisting, for example, of two stop bodies 63 movable in a simultaneous and opposite manner in the transverse expansion direction. Said stop bodies 63 can be inserted into an expansion joint and the simultaneous movement thereof in opposite directions can then be caused until they contact the opposite joint faces 1 defining the expansion joint. Said stop bodies 63 can therefore center the jig 5 and the rest of the self-expanding seal system attached thereto with respect to the expansion joint, regardless of their width, and they can even fix the jig 5 temporarily in said position to make the operator's task easier.

An example of said centering mechanism 60 can be, by way of example, a double screw mechanism 61 which, upon rotation, causes an identical movement, but in opposite directions, of the two arms 62 connected to the respective stop bodies 63, said movement being a guided movement.

Other mechanisms such as a pulley or gear system which reproduces the movement of one of the stop bodies 63 in the other opposite stop body 63, but in an opposite direction, for example, are possible.

By means of the proposed self-expanding seal system, an installation method for installing a seal retained in the pre-compressed position inside an expansion joint, which constitutes a second aspect of the present invention, can be implemented, and said seal can then be released to cause the expansion thereof inside the mentioned expansion joint, causing the sealing of the joint.

Figure 6:
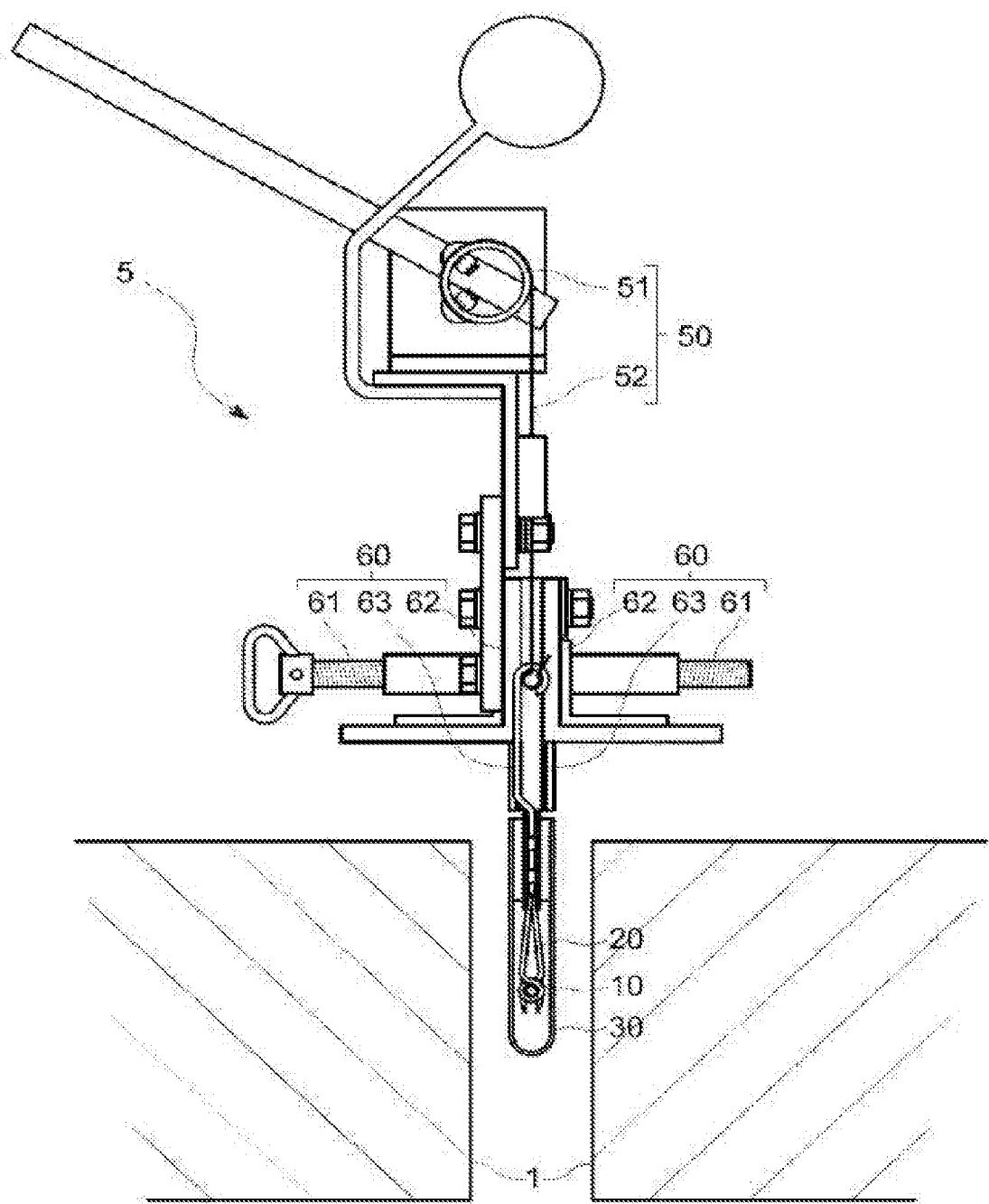

The sequence of FIGS. 6 to 9 shows successive steps of the proposed method in which FIG. 6 shows a self-expanding seal system in the pre-compressed position connected to a jig. The jig is located above the opening of an expansion joint and has a centering mechanism 60 provided with two stop bodies 63 which, in the present FIG. 6, are separated from the joint faces 1 and therefore have yet to perform their centering task.

Figure 7:
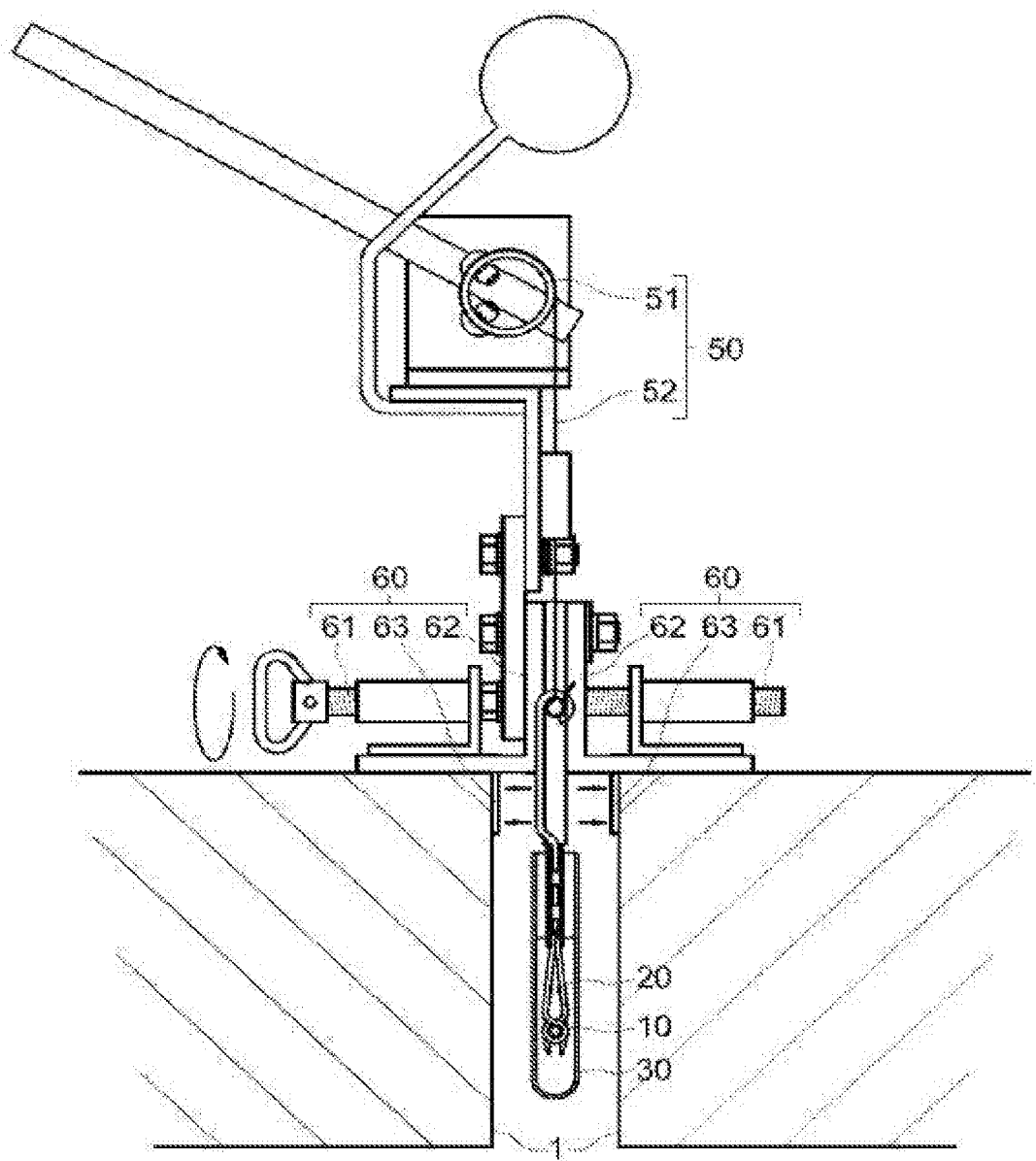
Figure 8:
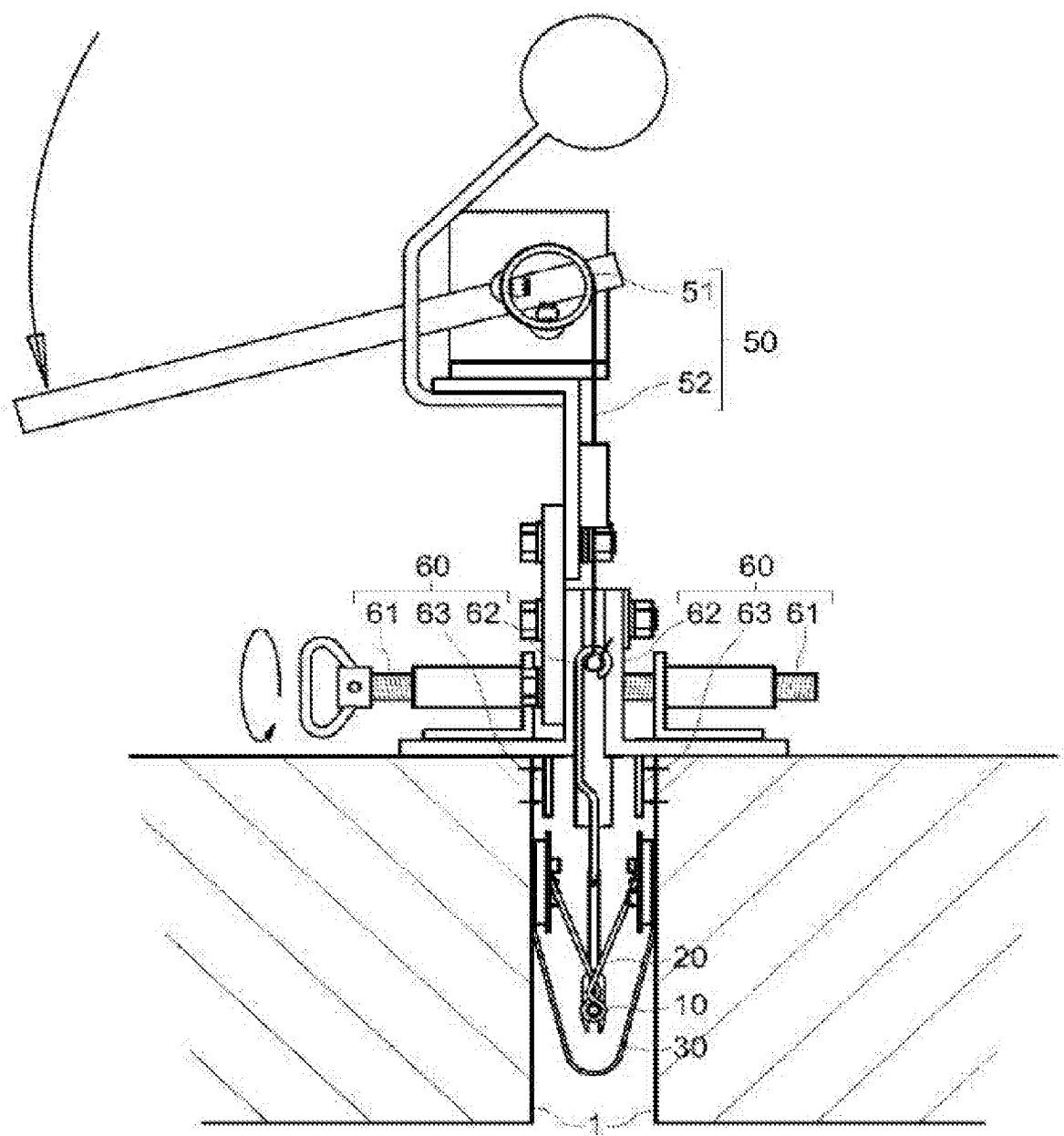

In FIG. 7, said two stop bodies 63 are already pressed against the joint faces 1, a position that is achieved by means of rotating the screw mechanism 61 described above. In FIG. 8, the self-expanding seal system is in the expanded position as the connectors 43 have been removed from the eyelets of the first and second anchors 41 and 42, and the first and second bodies 11 and 12 therefore pressing against the two joint faces 1.

The removal of said connectors 43 is achieved by means of activating the rotation of a rod 51 integrated in said jig 5 making up the operating mechanism 50. The mentioned rod 51 is connected to belts 52 attached to said connectors 43, so the mentioned rotation of the rod 51 causes the belt 52 to wind around same, causing the movement of the connectors 43, releasing the retainer device.

Figure 9:
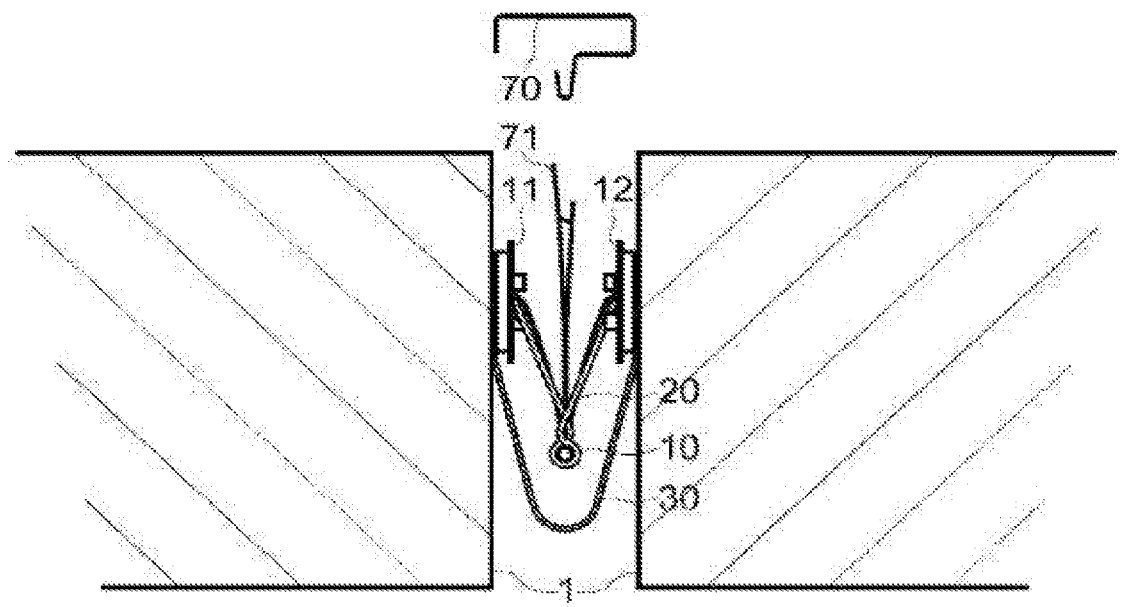
Figure 10:
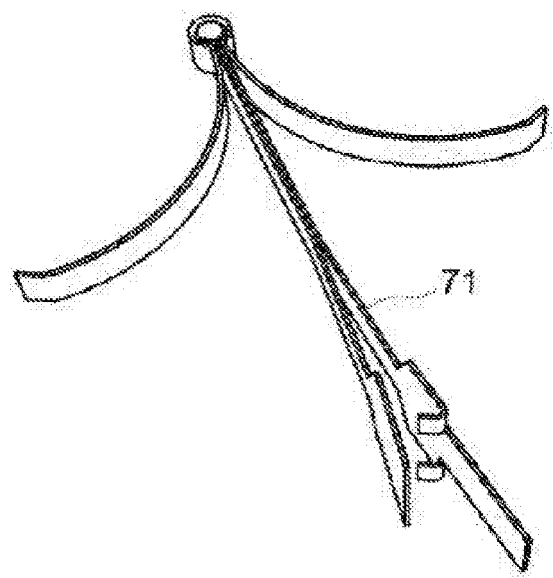
FIGS. 10 and 11 show two trim supports according to two different embodiments, each provided with a support to be connected to the intermediate rod, another support for holding the trim cover, and two spring-like legs which allow keeping said trim support centered with respect to the first and second bodies.
Figure 11:
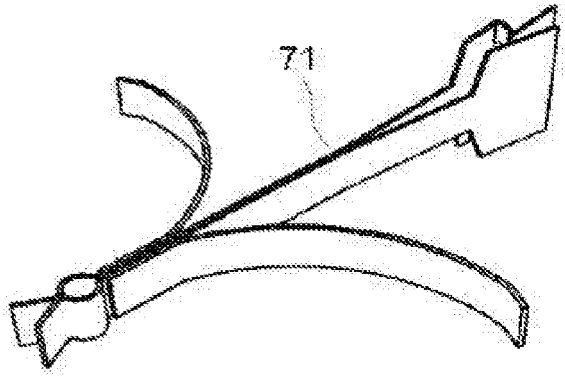
Figure 12:
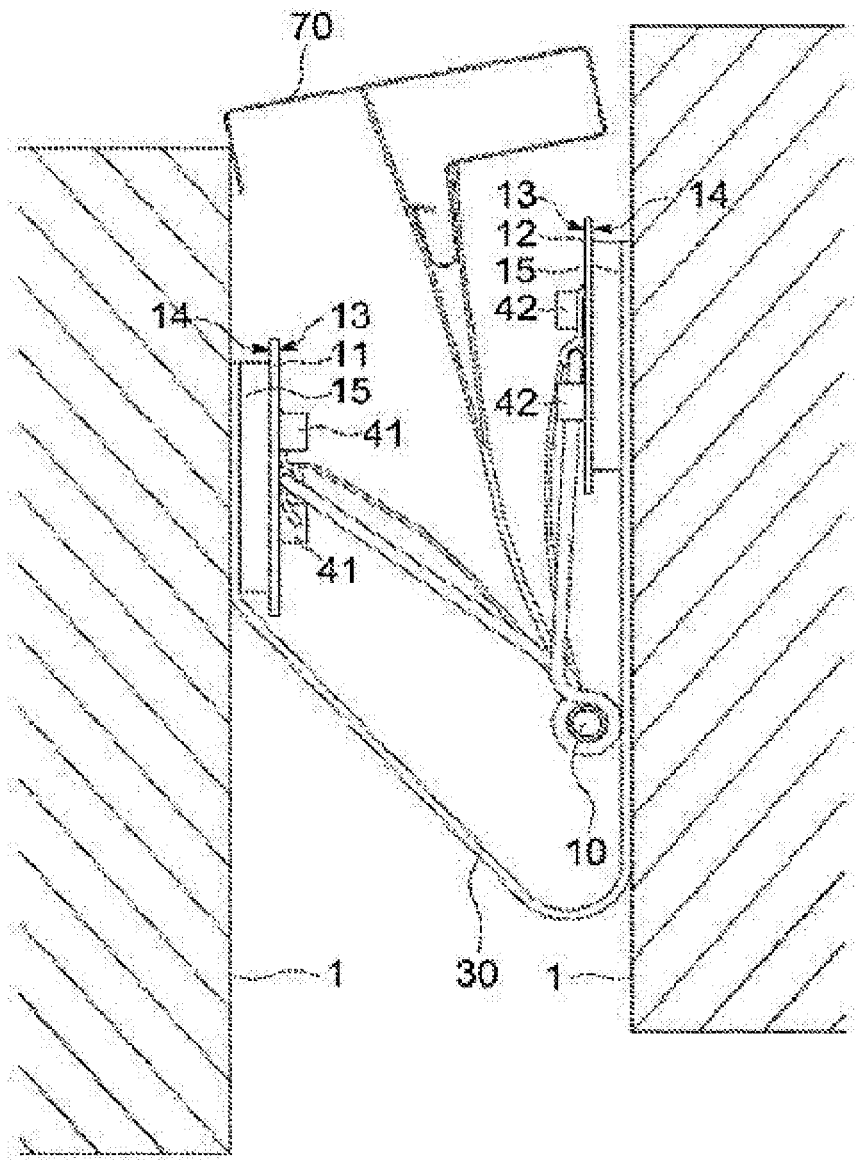
FIG. 12 shows a view equivalent to the view shown in FIG. 2, but after a movement of one of the two joint faces in a transverse direction perpendicular to the transverse expansion direction due, for example, to the face collapsing, showing how the proposed seal adapts to said movement without losing sealing capacity by means of a rotation of the expanders.
Figure 14:
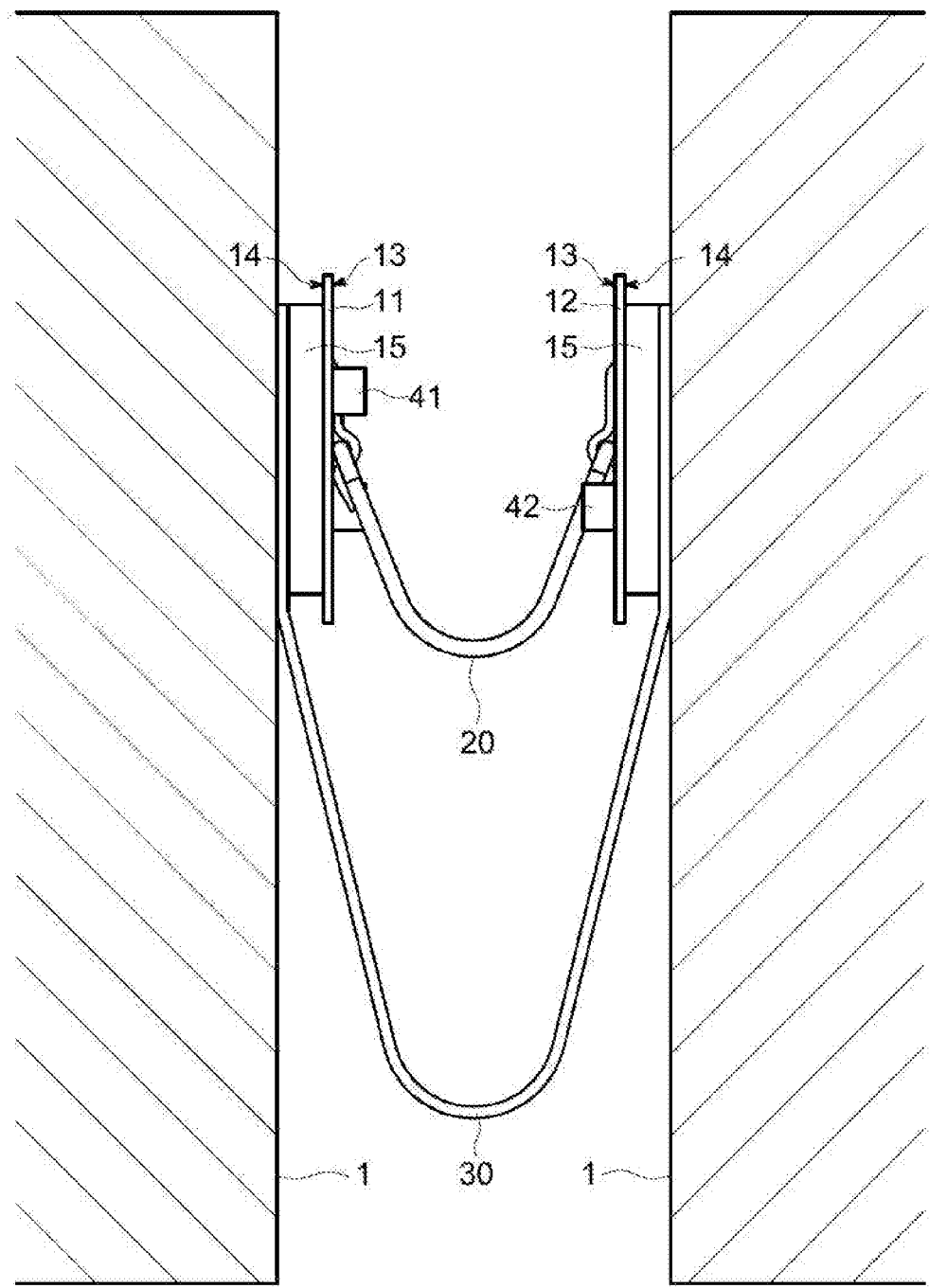
FIG. 14 shows the same view as FIG. 3 but according to an alternative embodiment of the self-expanding seal system in which the elastic expanders are transverse strips or transverse rods under bending stress connected to the first and second bodies.

FIG. 9 shows how the jig has been uncoupled from the rest of the self-expanding seal system which is retained between said two joint faces 1 as a result of the expansive force exerted by the expanders 20, and how a trim cover 70 for concealing the self-expanding seal system retained between said two joint faces 1 is fixed to said self-expanding seal system by means of a trim support 71 connected to said intermediate rod 10.

A detailed description of the proposed seal, including the preferred geometry and dimensions of each of the elements making up same, as well as the materials from which they are formed, is attached below for greater clarity.

Each longitudinal segment of the seal is made up, among other elements, of two flat strips having the same section of 30 mm×0.8 mm and a length of 2.555 m, constituting said first and second bodies 11 and 12. Said strips will be made of stainless steel or any other material having similar resistant and flexible, preferably oxidation-resistant, characteristics, said material being a metal or synthetic material.

Said strips will be arranged opposite one another by one of the flat faces, constituting the mentioned inner faces 13, with the other two opposite flat faces of the strips constituting the outer faces 14 of the first and second bodies 11 and 12 provided for being arranged opposite the joint faces 1 of an expansion joint to be sealed.

The flat and thin geometry and the position of said strips with respect to the joint faces 1 allow said strips to have flexibility, and therefore a good capacity for flexible adaptation against the two opposite joint faces 1 of the expansion joint, where said strips do not necessarily have to be perfectly linear or parallel, due to the effect of a mechanical expansive force between said two opposite strips.

The mentioned expansive force is provided by torsion springs or springs made of stainless steel or any other metal or synthetic material having similar elastic characteristics, and they will be arranged in series between and along both strips, said springs constituting the mentioned elastic expanders 20.

Said springs are compressed between the flat inner faces of both strips, applying expansive pressure on the seal. The mentioned springs apply said expansive force on points of the central longitudinal axis of the inner faces 13 in a profuse and regularly distributed manner, being attached to said points by means of swivel connections. Said swivel connections only allow exerting forces perpendicular to the inner face 13 of the strips on said central longitudinal axis.

Each of these springs are torsion springs consisting of two symmetrical coils with a coinciding axis, described above as coil springs 26 and 27, with two end lever arms corresponding to the first and fourth lever arms 21 and 24, both orthogonal to the axis of the coils, each of these end arms incorporating an orthogonal tab for the engagement thereof with one of the strips by means of a swivel connection and for the transmission of pressure to said strip, and a continuous, double-wire intermediate lever arm 25 also orthogonal to the axis of the coils, for pressing on the opposite strip only by contact in the opposite direction of the preceding arms. The diameter of the wire of the spring is about 1.4 or 1.5 mm, and the length of the lever arms is about 40 mm, the total dimension of the spring in the direction of the axis of the coil is 40 mm, with a standby position in which the end arms form an angle of 180° with respect to the central double arm.

The specific configuration of the springs described in the preceding section allows distributing said springs by their successive insertion, through the hollow central shaft of their coils, into a longitudinal rod making up the intermediate rod 10 which is made of stainless steel or of any other metal or synthetic material having similar characteristics. It is envisaged that the diameter thereof is 3 mm and the length thereof is similar to the length of the strips, with a spring being arranged every 55 mm and in an inverted position in which each spring is inverted with respect to the preceding one, i.e., with the two end arms having a tab of the first inserted spring being located on the right, and with the same elements of the next spring being located on the left.

By means of die-cut or superimposed housings obtained or arranged in series along the central longitudinal axes of the flat opposite inner faces 13 of each of the two strips, said strips engage with the springs in a swiveling condition as follows: the strip on the right engages with the pairs of tabs of the lever arms located on the same side, and in contrast the strip on the left engages with the pairs of tabs of the lever arms located on the left.

Once these springs have been inserted in the rod longitudinal every 55 mm, with alternating positions and alternating engagement with one strip or another, ex-works pre-compression of all the springs of a segment is achieved by moving one spring against another one by means of a tool designed for that purpose and maintaining their respective parallel flat inner faces 13 almost in the contact position. In turn, this closed position of maximum compression is immobilized at will by means of a releasable retainer device 40 arranged ex-works every 110 mm along the inner faces 13 of the strips.

In each level, the releasable retainer device 40 is made up of a pair of die-cut housings or superimposed sheaths corresponding to first anchors 41 arranged on a first strip and second anchors 42 arranged on a second strip, respectively, and a stainless steel rod having a diameter comprised between 1.8 and 2.0 mm, to be introduced in both first and second anchors 41 and 42 like a connector 43 according to the direction and coinciding axis on which these anchors have been arranged, preferably perpendicular to the intermediate rod 10.

A waterproof flexible body 30 measuring 0.15 m×2.605 m and having a thickness between 0.8 and 1.00 mm is arranged by way of a glued waterproof film, connecting the two opposite flat outer faces 14 of both strips, surrounding the intermediate rod 10 and the expanders 20 threaded thereon, with respective strips of spongy elastomer material 15 having a width of 25 mm and a thickness of 2 or 3 mm, which is proposed in this embodiment to be ethylene propylene diene monomer rubber, known as EPDM rubber, optionally being sandwiched between this film and each outer face 14 of each strip. Said strips of elastomer material 15 will provide the assembly with sealing capacity and improved adaptability to small imperfections of both joint faces 1.

As can be seen with the proposed dimensions, the waterproof flexible body 30 has a length that is 5 cm longer than the length of the strips, said extra 5 cm being arranged at the upper end of the strips after gluing so as to be able to provide continuity to the waterproofing system with the immediate upper segment through simple physical overlap. The on-site vertical placement of the different segments of the seal must therefore be performed from bottom to top. It is proposed that said waterproof flexible body 30 has a width with enough clearance so as not to interfere with the action of the mechanical part of the seal, preventing strains.

A jig 5 forms a specific tool for the on-site placement of each segment of the seal once it engages with said jig 5, which first allows positioning the seal at a correct height, and then simultaneously performing both the indispensable centering of the seal inside the joint at a correct calibrated depth as a result of a centering mechanism 60, and the locking of the jig-seal assembly on the work site, and finally it allows the simultaneous and instantaneous release of the assembly of connectors 43 in the form of rods from the retainer device 40 as a result of the operation of a release mechanism 50, so the outer faces of both strips and the end lips of the waterproof film, as they are released from the torsion spring assembly, will spring open driven by said springs such that they hit against the joint faces 1 of the joint to be sealed with force. Once these operations have been performed by simply unlocking the jig 5 by means of a device specific for this purpose, the jig can be removed to be used in a contiguous upper segment.

The placement of a trim cover 70 measuring 2.555 m in length serves to conceal and provide linear protection to the assembly as it is introduced with certain dimensional tolerance into the expansion joint to be treated, adjacent to the exposed opening of said joint. The trim cover 70 is fixed by means of being coupled to the rest of the seal already placed inside the joint, through the engagement thereof with occasional trim supports 71 made of stainless steel that are specific for this purpose, connected to the intermediate rod 10 which is concentric with the coils of the springs, and distributed along the intermediate rod 10 approximately every 44 cm. Each of these trim supports 71 has a pair of symmetrical centering springs for the purpose of centering the trim cover 70 inside the joint, the trim cover 70 having a dimension slightly smaller than the actual width of the expansion joint to be treated.

Said trim cover 70 can consist of a 0.20 mm-thick plate made of stainless steel or any other synthetic material having similar characteristics.

The very small thickness of the stainless steel plate of the trim cover 70 and its specific section are essential to make the plate readily deformable by transverse bending, so that in the event that the work joint is compressed during its service life to dimensions that are smaller than the initial apparent width of the trim cover 70, the trim cover 70 deforms, preventing the adjacent work from becoming damaged.

The invention claimed is:

1. A self-expanding seal system for sealing expansion joints formed between two rigid opposite joint faces of two adjacent constructive bodies, said self-expanding seal system comprising:
    a first body elongated in a longitudinal direction and having an inner face and an outer face; and
    a second body elongated in a longitudinal direction and having an inner face opposite and spaced apart from the inner face of the first body, and an outer face;
    said first and second bodies being configured for insertion into said expansion joint, with respective outer faces of said first and second bodies located opposite said joint faces;
    elastic expanders, selected from springs, transverse strips under bending stress, and transverse rods under bending stress connected to said first and second bodies, causing an elastic spacing of the bodies in a transverse expansion direction;
    a waterproof flexible body loosely connecting said first and second bodies;
wherein the mentioned self-expanding seal system further comprises:
    a releasable retainer device which keeps said self-expanding seal system in a pre-compressed position, said elastic expanders being retained under elastic stress.

2. The self-expanding seal system according to claim 1, wherein said outer faces of the first and second bodies include a covering made of an elastomer material between 0.5 and 3 mm thick.

3. The self-expanding seal system according to claim 1, wherein said elastic expanders include a first set of expanders and a second set of expanders, the elastic expanders constitutive of the first set of expanders including a region articulated to the inner face of the first body and an opposite region supported in a movable manner on the inner face of the second body; the elastic expanders constitutive of the second set of expanders including a region articulated to the inner face of the second body and an opposite region supported in a movable manner on the inner face of the first body, the elastic expanders constitutive of the first set of expanders are interspersed between the elastic expanders constitutive of the second set of expanders.

4. The self-expanding seal system according to claim 3, wherein said articulation between the region of the elastic expanders and one of the first and second bodies is carried out by means of arm anchors arranged in said first or second body.

5. The self-expanding seal system according to claim 3, wherein the elastic expanders constitutive of the first set of expanders, connected in an articulated manner to the first body, are slidably connected to the elastic expanders constitutive of the second set of expanders, connected in an articulated manner to the second body, allowing a relative movement in the longitudinal direction of the elastic expanders constitutive of the first set of expanders, together with the first body, with respect to the elastic expanders constitutive of the second set of expanders, together with the second body.

6. The self-expanding seal system according to claim 5, wherein the elastic expanders constitutive of the first set of expanders are slidably connected to an intermediate rod, permitting an slide in the longitudinal direction, and the elastic expanders constitutive of the second sets of expanders are slidably connected to the same intermediate rod, permitting an slide in the longitudinal direction.

7. The self-expanding seal system according to claim 1, wherein the elastic expanders are sized and distributed to produce an expansive force equal to or greater than 20 kg or 30 kg for every linear meter of seal.

8. The self-expanding seal system according to claim 3, wherein the elastic expanders are a plurality of torsion springs arranged at regular intervals along the longitudinal direction, each producing a force for separating the first body with respect to the second body in said transverse expansion direction.

9. The self-expanding seal system according to claim 8, wherein each of said torsion springs is made up of a single continuous torsion rod bended forming
- a first lever arm connected at one end to
- a first coil spring, attached at a distal end to
- a second lever arm which is in turn attached in continuity to
- a third lever arm which is attached to
- a second coil spring, which is connected to
- a fourth lever arm, said first and second coil springs being coaxial and said second and third lever arms being parallel to one another, forming as a whole an intermediate lever arm, and said first and fourth lever arms being parallel to one another.

10. The self-expanding seal system according to claim 9, wherein the first and fourth lever arms include the region articulated with respect to the inner face of one of the first and second bodies, and wherein the intermediate lever arm is include the opposite region supported in a movable manner on the inner face of other of the first and second bodies.

11. The self-expanding seal system according to claim 9, wherein all the coil springs of all the torsion springs are coaxial and are all coiled around the same intermediate rod-.

12. The self-expanding seal system according to claim 11, wherein there is included a plurality of trim supports attached at regular intervals on said intermediate rod, said trim supports being provided for the anchoring of a trim cover to conceal the self-expanding seal system.

13. The self-expanding seal system according to claim 1, wherein said retainer device consists of a plurality of first anchors arranged in said first body, a plurality of second anchors arranged in said second body, and connectors simultaneously attached to said first anchors and to said second anchors, fixing the relative position thereof.

14. The self-expanding seal system according to claim 13, wherein said first and second anchors are eyelets configured for being aligned when the first and second bodies are arranged close to one another, and wherein said connectors consist of pins provided for being inserted through said eyelets in a transverse direction perpendicular to the transverse expansion direction.

15. The self-expanding seal system according to claim 1, wherein the mentioned releasable retainer device is associated with a release mechanism, provided for causing the release of the mentioned releasable retainer device and the subsequent expansion of the elastic expanders, said release mechanism being integrated in a jig that can be separated from the rest of the self-expanding seal system after placement thereof.

16. The self-expanding seal system according to claim 15, wherein said release mechanism causes the simultaneous release of the retainer device in the entire seal.

17. The self-expanding seal system according to claim 15, wherein said release mechanism causes the movement of connectors in a transverse direction perpendicular to the transverse expansion direction, causing an extraction thereof from the first and second anchors arranged respectively in the first and second bodies, causing the release thereof.

18. The self-expanding seal system according to claim 15, wherein the self-expanding seal system further comprises a centering mechanism which positions the rest of the self-expanding seal at a pre-defined depth, and in a centered position with respect to said two rigid opposite joint faces of two adjacent constructive bodies of the expansion joint.

19. The self-expanding seal system according to claim 18, wherein said centering mechanism can be released from the rest of the self-expanding seal system and/or is integrated in said jig and/or can be adjusted.

20. The self-expanding seal system according to claim 19, wherein said centering mechanism consists of at least two opposite stop bodies movable in a direction parallel to the transverse expansion direction in a simultaneous and symmetrical manner.

* * * * *